2,961,339

FREE FLOWING, HYDROPHOBIC GRANULAR STARCH AND METHOD OF MAKING THE SAME

Ivan A. Wolff, Peoria, Ill., assignor to the United States of America as represented by the Secretary of Agriculture No Drawing. Filed Mar. 27, 1953, Ser. No. 345,268

4 Claims. (Cl. 117—63)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a novel, free flowing, modified starch and to methods for preparing it. It relates more particularly to treated starch in granule form that is markedly more resistant to swelling than normal untreated granular starch, and to methods for preparing such treated starch which include novel steps of treating with alkyl siliconates, followed by drying, and washing the treated starch.

Alkyl siliconates, in the form of the alkali metal salt, are known in the art as agents for imparting water resistance or water repellency to a wide variety of substances such as masonry, water base paint ingredients, powdered materials such as limestone, gypsum, and the like, paper, paperboard, and various textiles.

The prior method of applying the alkyl siliconates in treating such materials as named in the foregoing paragraph is to contact the material to be treated with an aqueous solution of the monosodium salt. This may be done by spraying, dipping or forming a suspension, the specific manner depending mostly upon the character of the material. After contact, the treated material is dried.

A flowsheet of the improved process is as follows:

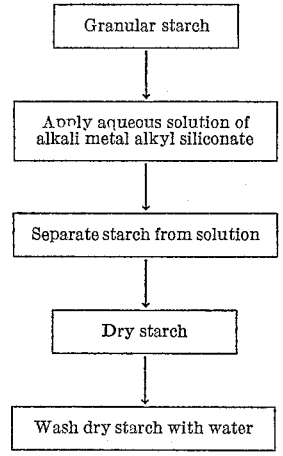

I have found that granular starch when subjected to the foregoing treatment is water-repellent, but possesses an undesirably high residual alkalinity in water. Consequently, although it is possible to treat granular starch in accordance with prior siliconate treatment methods, the treated starch is in an unsatisfactory condition for most purposes. I have further found that, while the undesirable alkalinity may be eliminated by washing the moist treated starch, that substantially all the effect of the siliconate treatment is simultaneously lost, and the washed starch is left in its original condition, being no longer hydrophobic or water-repellent.

It has been discovered, however, that if granular starch is first treated with an aqueous solution of the alkali metal salt of alkyl siliconates such as sodium methyl siliconate and then permitted to air dry at approximately room temperature, the surface of the granules are in a quite remarkably peculiar condition. The water-repellent or hydrophobic quality appears to be fixed on the dried granules by some interactive change occurring between the starch surface and the alkyl siliconate during the drying period. However, the alkalinity associated with the granules treated in this way is not fixed, but may be removed entirely by subsequently washing with water.

The siliconate treating solutions which achieve this novel effect may vary over a wide range of concentration, but dilute solutions of about 1 to 5 percent are preferred for reasons of economy and convenience.

Utilizing these discoveries, I have invented a novel siliconated granular starch which is not only water-repellent, but is also completely free of undesirable alkalinity. My novel product is moreover remarkably free-flowing. In dry powder form it possesses properties of mobility and flow that are almost equal to those of a liquid. A still further advantageous characteristic of my product is that it is resistant to water at temperatures up to 50° C. However, when added to water at or near the normal gelation temperature, the starch is wetted and possesses the ability to form smooth pastes and dispersions.

My novel siliconated starches are particularly useful as a rubber dusting material, as a dry lubricant, and as a detackifying agent. Other uses will readily occur to those skilled in the art.

The pasting characteristics of my product are not the same as unmodified granular starch, but differ therefrom by a considerable extent, as will be seen from the data given in the examples below.

The novel product and method of preparing it are illustrated in the following specific illustrative examples. Although cornstarch is emphasized therein, it is to be understood that other starches, such as wheat, rice, sorghum, potato starch and the like, may be substituted therefor.

Example 1

Cornstarch powder was suspended in a 2 percent solution of sodium methyl siliconate and then filtered. The moist starch was divided into portions and given a variety of treatments as indicated in the table below.

TABLE I

*Properties of sodium methyl siliconate treated starches*

[5-25 gm. starch suspended in 100 ml. 2% by weight siliconate, filtered

| Treatment of product in addition to the above | Product Alkaline | Product Free-flowing | Product Hydrophobic | Product differs from control starch |
|---|---|---|---|---|
| 1. Air-dried | yes | | yes | no. |
| 2. Washed on filter and then air dried. | no | | no | no. |
| 3. Air-dried, washed with water, again air-dried. | no | yes | yes | yes. |
| 4. Product No. 3 equilibrated at 61% R.H. | no | yes | yes | yes. |

The hydrophobic quality of the starches from treatments 1, 3 and 4 was such that even upon rigorous stirring the starch was not wetted, and the water remained clear. Upon heating, however, the starch seemed to disperse throughout the solution.

Pasting experiments (5 percent starch concentration) were run to see what effect this modification had on the starch. In the air-dried only sample the pasting characteristics were the same as a control starch in water and a control starch in strongly alkaline water. With the product of treatments 3 and 4, however, the pasted solution showed no inclination towards gelling. In a swelling test run on the modified starch and control starch, the control starch formed such a gel that the tube could be up-ended, while the modified starch solution was quite fluid by contrast.

*Example 2*

To make a further comparison between the methyl siliconate treated starch of Example 1 and the unmodified original corn starch, 1, 3, 5, and 8 percent pastes of each were prepared by heating on the steam bath for 30 minutes (beakers, brisk stirring with glass rods). The appearances of the mixtures were as follows:

| Concentration | Appearance after 17 hours |
| --- | --- |
| 1% Methyl siliconate treated | Swollen granules settled-sl., opalescent supernatant. |
| Control | Swollen granules occupy larger volume than above—supernatant more opalescent. |
| 3% Methyl siliconate treated | Swollen granules settled. |
| Control | Homogeneous paste. |
| 5% Methyl siliconate treated | Thick paste. |
| Control | Gel. |
| 8% Methyl siliconate treated | Gel. |
| Control | Firmer gel than above. |

I claim:

1. The method comprising subjecting granular starch to an aqueous solution of an alkali metal siliconate, separating said starch from said solution thus obtaining granular starch moistened with residual solution, drying said starch and washing the dried starch with water.

2. The method of claim 1 in which the treating solution comprises a solution of sodium methyl siliconate.

3. A new composition of matter comprising a free flowing dry granular starch, hydrophobic in character and resistant to gelation, the product of claim 1.

4. The method comprising suspending starch granules in an aqueous solution of an alkali metal methyl siliconate, filtering off the starch granules to obtain starch granules moistened with said solution, drying the filtered starch granules, and removing residual alkalinity from said dried granules by washing with water.

References Cited in the file of this patent
UNITED STATES PATENTS

| | | |
| --- | --- | --- |
| 2,140,375 | Allen et al. | Dec. 13, 1938 |
| 2,507,200 | Elliott et al. | May 9, 1950 |
| 2,614,945 | Krisan | Oct. 21, 1952 |
| 2,647,892 | La Brie et al. | Aug. 4, 1953 |

UNITED STATES PATENT OFFICE

CERTIFICATION OF CORRECTION

Patent No. 2,961,339                                    November 22, 1960

Ivan A. Wolff

It is hereby certified that error appears in the above numbered patent requiring correction and that the said Letters Patent should read as corrected below.

Column 2, line 52, Table I, in the heading thereto, after "filtered" insert a closing bracket; column 4, line 3, after "metal" insert -- alkyl --.

Signed and sealed this 9th day of May 1961.

(SEAL)
Attest:

ERNEST W. SWIDER
Attesting Officer

DAVID L. LADD
Commissioner of Patents